(12) United States Patent
Elbert et al.

(10) Patent No.: US 11,184,453 B2
(45) Date of Patent: Nov. 23, 2021

(54) SYSTEMS AND METHODS FOR MANAGING CONTENT IN A NETWORK

(71) Applicant: Synamedia Limited, Staines Upon Thames (GB)

(72) Inventors: Dan Ariel Elbert, Jerusalem (IL); Vadim Kharitonsky, Kfar Adumim (IL); Anatoly Seldin, Jerusalem (IL); Meidad Zaharia, Rishon le Zion (IL)

(73) Assignee: SYNAMEDIA LIMITED, Staines Upon Thames (GB)

( * ) Notice: Subject to any disclaimer, the term of this patent is extended or adjusted under 35 U.S.C. 154(b) by 0 days.

(21) Appl. No.: 16/847,192

(22) Filed: Apr. 13, 2020

(65) Prior Publication Data

US 2021/0320981 A1 Oct. 14, 2021

(51) Int. Cl.
*H04L 29/08* (2006.01)

(52) U.S. Cl.
CPC ...... *H04L 67/2804* (2013.01); *H04L 67/2847* (2013.01); *H04L 67/306* (2013.01)

(58) Field of Classification Search
None
See application file for complete search history.

(56) References Cited

U.S. PATENT DOCUMENTS

| | | |
|---|---|---|
| 9,319,265 B2 | 4/2016 | Bloomstein |
| 10,289,555 B1 | 5/2019 | Michaud |
| 2009/0299843 A1* | 12/2009 | Shkedi .............. G06Q 30/02 705/14.25 |
| 2013/0066936 A1* | 3/2013 | Krishnan ............ H04L 67/289 709/201 |
| 2016/0284139 A1* | 9/2016 | Klein ................. G07C 9/00571 |
| 2017/0149855 A1* | 5/2017 | Doshi ............. H04N 21/26216 |
| 2017/0201571 A1* | 7/2017 | Sherf .................... H04N 21/20 |
| 2019/0082205 A1* | 3/2019 | Ambrozic ......... H04N 21/4532 |
| 2020/0186878 A1* | 6/2020 | Regev ............... H04N 21/4668 |
| 2021/0029182 A1* | 1/2021 | Mappus ............ H04L 43/0876 |

OTHER PUBLICATIONS

Can Mehteroglu, "Semantic prefetching and caching in 5G," MS Thesis, School of Natural and Applied Sciences, Middle East Technical University, Aug. 2017.
Can Mehteroglu et al., "A framework for semantic in-network caching and prefetching in 5G mobile networks," arXiv:1711.10154v1, Nov. 28, 2017, 7 pages.
Gu, Peng & Wang, Jun & Zhu, Yifeng & Jiang, Hong & Shang, Pengju. (2010). A Novel Weighted-Graph-Based Grouping Algorithm for Metadata Prefetching. IEEE Trans. Computers. 59. 1-15. 10.1109/TC.2009.115.

* cited by examiner

*Primary Examiner* — James A Edwards
(74) *Attorney, Agent, or Firm* — Finnegan, Henderson, Farabow, Garrett & Dunner, LLP

(57) ABSTRACT

A method for managing content in a network having one or more user devices and one or more edge computing systems includes determining a likelihood that a user device will connect to an edge computing system during a time window, based on the determined likelihood, storing on the edge computing system information reflecting an activity pattern associated with the user device, receiving a request for content from the user device, generating metadata based on the stored information and the request, and transmitting the metadata to the user device.

20 Claims, 12 Drawing Sheets

501

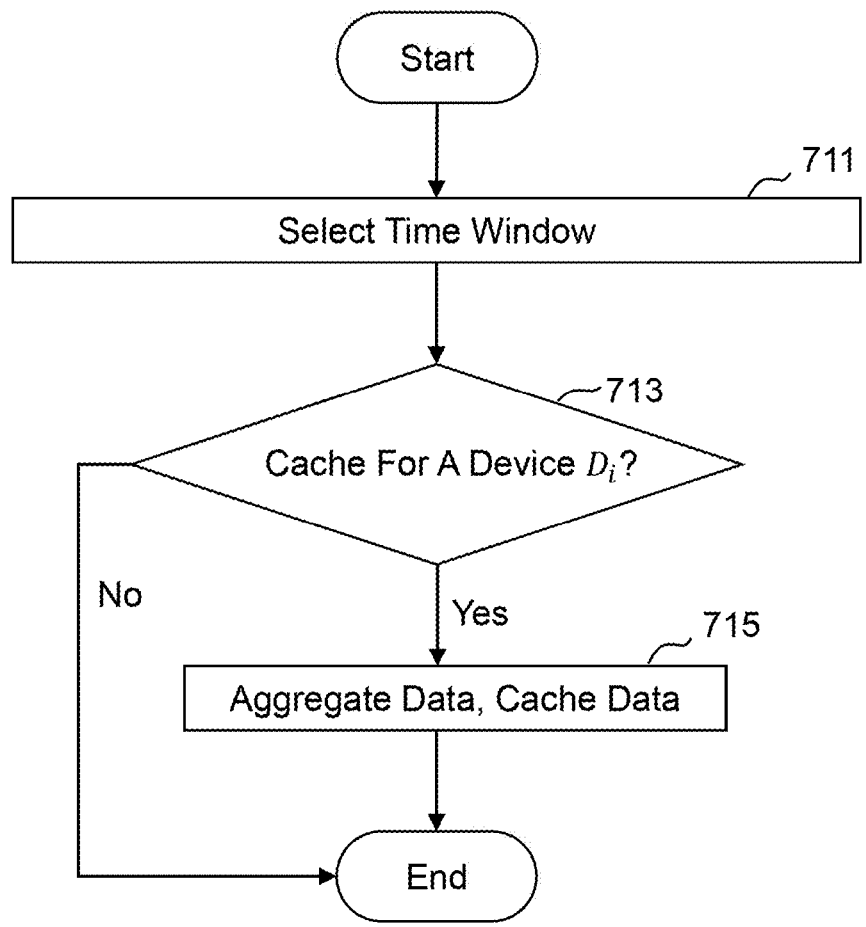

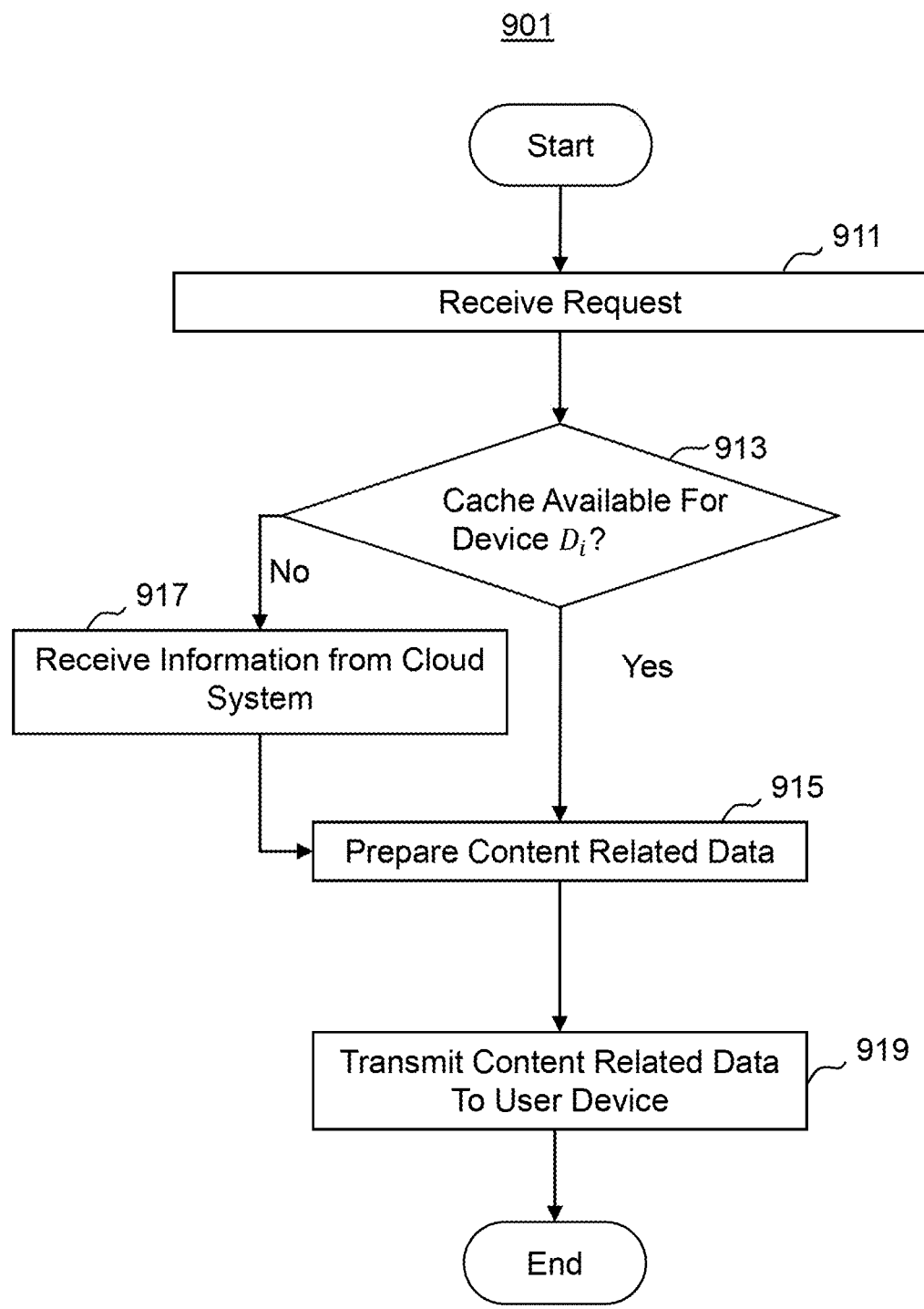

SYSTEMS AND METHODS FOR MANAGING CONTENT IN A NETWORK

TECHNICAL FIELD

The present disclosure relates to systems and methods for distributing content, and more particularly, to systems and methods for providing metadata to a user device.

BACKGROUND

Next-generation networks, such as 5G networks, are expected to distribute a large amount of video and audio content. 5G networks are bringing fast connections as well as smart edge services in order to achieve low latency. Predictive aggregation of personalized and non-personalized metadata using 5G edge computing systems may help to achieve lower latencies for client devices and optimize cloud resources and costs associated with such client devices connecting to a content distribution network. For example, when a client device connects to a cloud service (such as Synamedia TV Cloud Service), the service may provide to the client device the relevant metadata, which is a combination of personalized and non-personalized metadata. Aggregation of personalized and non-personalized metadata typically requires additional cloud resources for each request. For example, when the client device requests to display linear schedule metadata, which has to be filtered according to the user entitlements and decorated with the user DVR bookings and recordings information, the client device may submit a request to the cloud service. However, for each request, the cloud service may need to obtain a current schedule for currently played content (or obtain a list of available content) and decorate it with the personalized user metadata, in order to generate a unique aggregated personalized response for the specific user device. Such a process by the cloud service results in additional cost and traffic to the cloud service and additional latency when responding to the user request.

In 5G networks, in order to achieve low latency/costs, some of the functionality of the network services may be performed by 5G edge computing systems, which may be configured to handle a variety of requests from user devices due to their computation capabilities and storage that may be associated with the edge computing systems. For example, an edge computing system may be able to handle a few thousand connected devices at once.

The disclosed systems and methods for providing metadata to client devices address one or more of the problems set forth above and/or other problems in the prior art. Note that solutions described herein may be applicable not only to TV-related broadcasting systems but to any type of systems that uses personalized metadata in cloud services (for example, online shopping systems, interfaces for displaying train timetables, personal advertisements, and the like).

SUMMARY

It is expected that a significant percentage of user devices connected to an edge computing system in a 5G network may repeat their usage patterns every day (e.g., people traveling on the same route to their working places at the same or similar hours and returning to their houses in the evening during working days), and these user devices are expected to connect to (mostly) the same set of 5G edge computing systems. Thus, information associated with requests from users of the user devices may be pre-fetched from a cloud system and cached on an edge computing system to reduce the number of user requests to the cloud system.

Consistent with a disclosed embodiment, a method for managing content in a network having one or more user devices and one or more edge computing systems is provided. The method includes determining a likelihood that a user device will connect to an edge computing system during a time window, and based on the determined likelihood, storing on the edge computing system information reflecting an activity pattern associated with the user device. The method further includes receiving a request for content from the user device, generating metadata based on the stored information and the request, and transmitting the metadata to the user device.

Consistent with another disclosed embodiment, a method for managing content in a network having one or more user devices and one or more edge computing systems is provided. The method includes determining an expected utility for storing information for a user device on an edge computing system, and based on the determined expected utility, storing on the edge computing system, information reflecting an activity pattern associated with the user device.

Further, consistent with disclosed embodiments for the content management methods, a non-transitory computer readable medium is provided. The non-transitory computer readable medium includes instructions that, when executed by at least one processor, cause the at least one processor to perform operations of any of the content management methods discussed herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings:

FIG. 7 is an example flowchart of a process for storing content at an edge computing system, consistent with disclosed embodiments.

FIG. 9 is an example process for providing content to a user device, consistent with disclosed embodiments.

DETAILED DESCRIPTION

Reference will now be made in detail to example embodiments discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
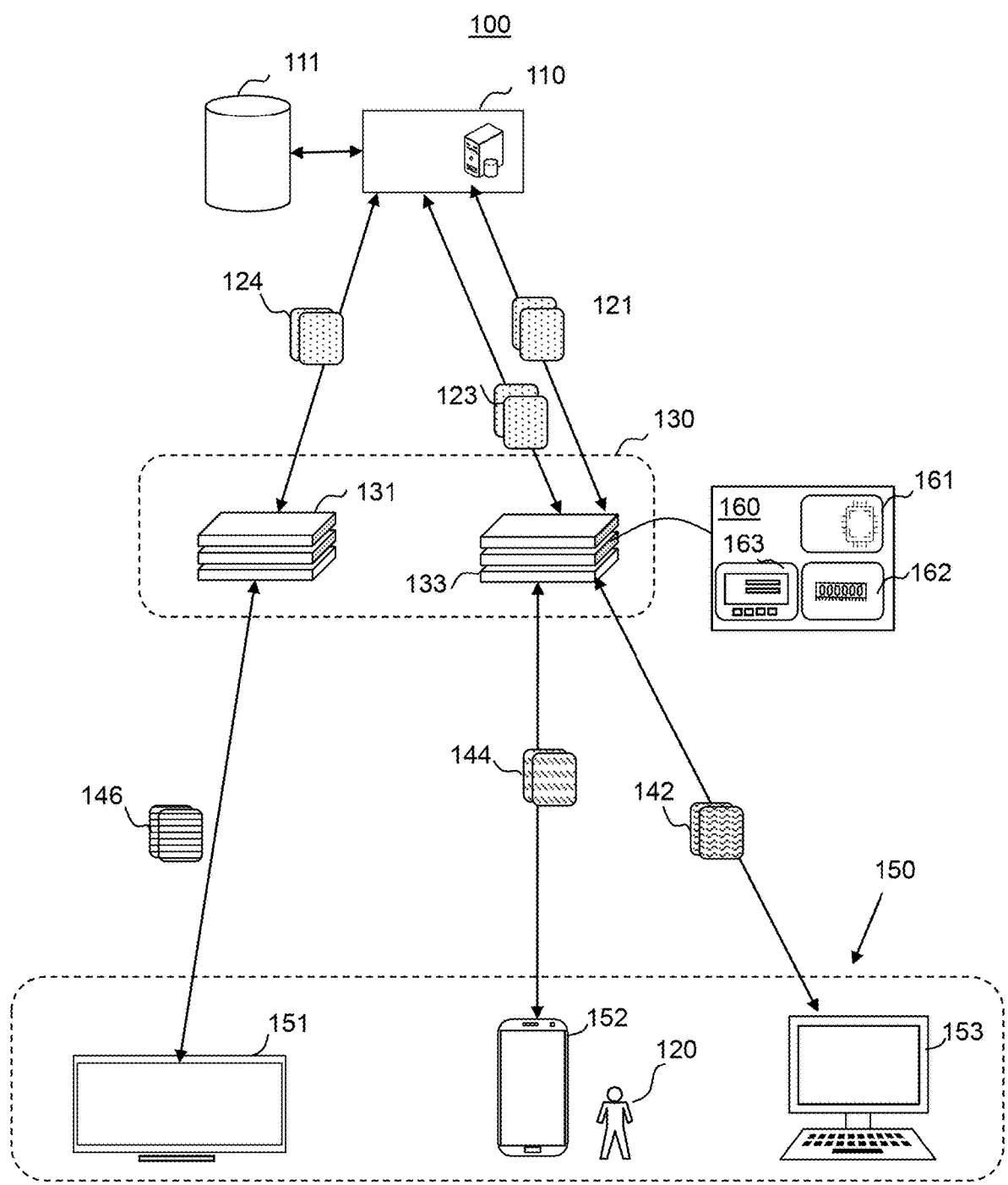
FIG. 1 is an illustrative content distributing system, consistent with disclosed embodiments.

A content distributing system 100 is shown in FIG. 1. System 100 may include a cloud system 110 (also referred to as a cloud computing system 110), a set of edge computing systems 130 communicatively connected to cloud system 110, and user devices 150. For example, FIG. 1 shows an edge computing system 131 connected to a device 151 and an edge computing system 133 connected to a device 152 and a device 153. In some instances, an edge computing system may include a software and related hardware (herein referred to as a request processing system) for analyzing requests from user devices 150 and for processing data related to the requests. In an example embodiment, FIG. 1 shows a request processing system 160 as a part of edge computing system 133. System 160 may include one or more processors 161, a memory 162 for storing programming instructions, and an interface 163 for modifying programming instructions and controlling various parameters of system 160.

In various embodiments, cloud system 110 may include at least one database such as database 111 for storing content, including, for example, the multimedia data, and any other relevant data related to the performance of cloud system 110. For example, other relevant data may include profile data of various users of cloud system 110 that can include user multimedia preferences, user authentication information, or any other user related information (e.g., links to other users, and the like). Cloud system 110 may include at least one processor for performing various tasks, such as receiving communication data from edge computing systems 133, decrypting the communication data, for cases when the data is encrypted, analyzing the communication data (e.g., determining what type of multimedia is being requested by a user device, authenticating the user device, and the like), retrieving multimedia content requested by the user device, encrypting the content, and transmitting the encrypted content to one or more edge computing systems. FIG. 1 shows, for example, that encrypted communication data 121 is communicated to cloud system 110 that may include a request for multimedia content by device 153. Cloud system 110 may retrieve multimedia content 123, encrypt content 123, and communicate content 123 to edge computing system 133. In an example embodiment, edge computing system 133 may communicate with device 153 using data packages 142 to obtain identifiable information (e.g., device identification, account-related information, or user-related information as described above). FIG. 1 shows content 123, 124 that are used for data exchange between cloud system 110 and edge computing systems 131 and 133 and data packages 146, 144, and 142 used for exchanging data between edge computing systems 133 and user devices 150.

In various embodiments, content may be any suitable multimedia content. The multimedia content can include a video signal (e.g., streaming video), an audio signal, an image, speech signals, 3D graphical objects, texts, software codes, network streams, XML data, or any other suitable binary or text data. Further, it should be noted that content distributing system 100 may not only distribute multimedia content (e.g., video content such as TV broadcasting programs) but may distribute any type of data that may require receiving, transmitting, storing, and/or analyzing user-related information (e.g., user-related metadata). For example, content distribution system 100 may include distribution of shopping content, transportation schedules, personal advertisements, food menus, and the like.

Figure 2:
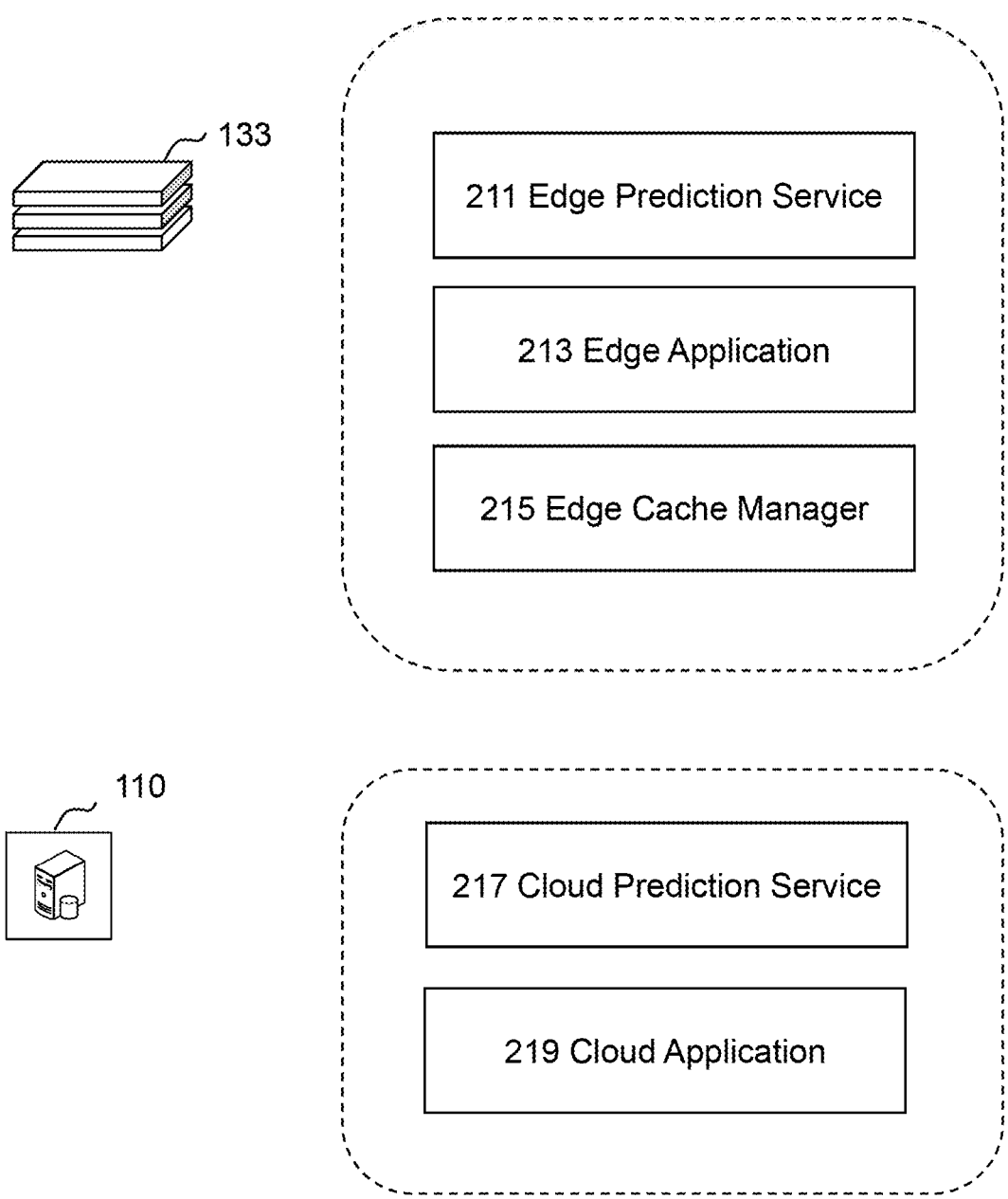
FIG. 2 shows example components of a cloud system and an edge computing system for providing content to a user device, consistent with disclosed embodiments.

An edge computing system (e.g., system 133, as shown in FIG. 2) may include an edge prediction service 211 and an edge application 213, and an edge cache manager 315, as shown in FIG. 2.

Edge prediction service 211 may be a software application configured to collect and store usage patterns (herein also referred to as activity patterns) of user devices (e.g., devices 150) connected to edge computing system 133. Activity patterns may be based on historical information of users requesting content from content distributing system 100. The historical information may include a type of content, a name of content, a channel name for broadcasting content, a time at which the request for content was made, a duration of time that was used for consuming the requested content, a genre of content, names of anchors, actors, celebrities, and the like featured in content, or a characteristic of a user consuming content (e.g., an age, name, gender, occupation, hobbies, interests, and the like for the user consuming the content). In some cases, content distributing system 100 may be configured to distribute interactive content for a user device (e.g., distributed content may include forms having fields, graphical user elements, or any other interactive elements that may be interacted by the user). For example, the distributed content may be a takeout menu form, and the user may select food items from a list of items to fill up the takeout menu form. In an example embodiment, a selected order may determine an activity pattern. For example, if a user selects poppyseed bagel with lox at about 8:00 am, such selection may correspond to an activity pattern. Interactive content may be any other content that may be represented by a webpage, a document, a video game, a standalone software application, or any other electronic content that may be interacted with by a user. For example, if interactive content is a video game, such as chess, and the user achieved a particular level of expertise, information about the user level and/or his style of playing, as well as information about a user age, a language of the user, and the like, may be used to establish activity pattern for the user.

In an example embodiment, activity pattern may be a collection of events related to a user interacting (or requesting content) from content distribution system 100. For example, an event may be described by a collection of event data $E_D=\{E, Et, P, E_C\}$, where event data $E_D$ includes a type of event E defined by event name, (e.g., E="order poppyseed bagel with lox"), an expected time Et at which the event E may happen (e.g., Et="8:00 am"), a probability P of the event E to happen (e.g., P=0.85, i.e., 85 percent of the time a user orders poppyseed bagel with lox at 8:00 am), and an expected edge computing system $E_C$ to which a device of the user is likely to connect. For example, event data may include $E_{D1}=\{E_1=\text{"Watch Morning Joe"}, Et_1=6:30\text{ am}, P_1=0.68, E_{C1}=134\}$, $E_{D2}=\{E_2=\text{"Watch One of Morning News Channel"}, Et_2=7:30\text{ am}, P_2=0.7, E_{C2}=134\}$, $E_{D3}=\{E_3=\text{"Read CNN News"}, Et_3=8:30\text{ am}, P_3=0.9, E_{C3}=132\}$. Herein, for example, $E_{C1}$, $E_{C2}$, and $E_{C3}$ are identification numbers associated with various edge computers. For non-interactive content, a collection of event data above, e.g., $\{E_{D1}, E_{D2}, E_{D3}\}$ may be used to establish an activity pattern AP for time interval $\{Et_1, E_{D3}\}$ between time 6:30 am and time 8:30 am, AP=$\{E_{D1}, E_{D2}, E_{D3}\}$. In some cases, AP($Et_1$)=$E_{D1}$, thus, activity patterns may correspond to event data.

In some cases, event data may include more complicated data than the examples described above. For example, event data may include correlations, logical conditions, or any other data that characterizes an event. For instance, an example of a more complex event E may be described by a sequence of steps: step 1 "initiate breakfast order at Manhattan Bagels," step 2 "check if Manhattan Bagels have poppyseed bagels," step 3 "if yes, order poppyseed bagel with lox," step 4 "if no, send an SMS message to a friend asking what alternative breakfast she prefers." It should be appreciated that an event of any complexity may be used to determine an activity pattern. In various embodiments, activity pattern may be determined based on content requested by a user (e.g., content requested by the user may be "Read CNN News").

Probability P, as described above, may be evaluated by analyzing historical data and determining how often a particular event happens. For example, if a user watches at 7:30 am "Morning Joe" 25 percent of the time, watches "Good Morning America" 45 percent of the time, then P may be determined to be 70 percent, that the user watches morning news at 7:30 am. In some cases, probability P may be a conditional probability based on an event, place, season, events involving another user, and the like. For example, in the winter, the user may be more likely to watch a weather channel at 7:30 am in the morning, and when in California, the user may be more likely to check information related to expected earthquakes.

In some cases, time information (e.g., a time of a day) may be used as an input to a computer-based software application such as a machine learning model to determine the most probable event for a user. In some cases, in addition to the time information, external event information (e.g., weather-related information, traffic-related information, information about a recurrent medical condition of a user, and the like) may be used as a part of the input to the computer-based software application to determine a most probable event for a user.

In an example embodiment, the machine learning model may be trained using historical data for a user. For example, historical time information and historical external events may be used as training data, and historical user requests may be used to modify parameters of the machine learning model. In various embodiments, the machine learning model may be trained for a particular user, for a particular user account, and/or for a particular user device. In various embodiments, parameters of the machine learning model may be stored in a user profile associated with the user.

Figure 3A:
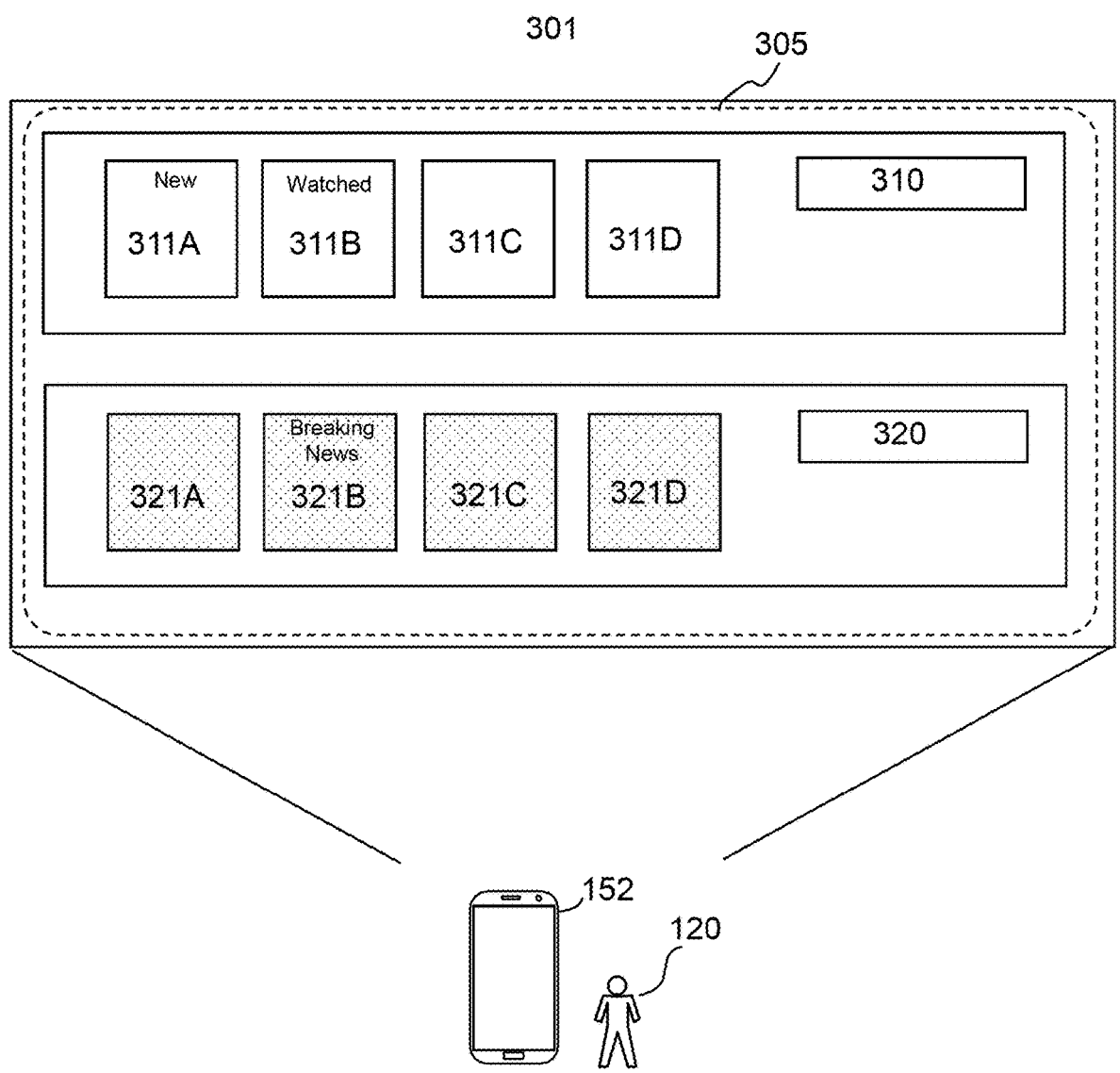
FIG. 3A shows an example interface for displaying metadata for a user device, consistent with disclosed embodiments.

FIG. 3A shows an example of interface 301 for displaying metadata 305 listing content 311A-311D and 321A-321D for a user (e.g., user 120) via a user device (e.g., device 152).

For example, content 311A-311D may be content of a particular category 310 (e.g., movies). Content 311A-311D may be decorated with notes related to user 120 (e.g., content 311B may include a note "watched" indicating that the content has been watched by user 120, content 311A may include a note "new" indicating that user 120 has not yet watched the content and content has been recently produced, and content 321B may have a note "breaking news"). In an example embodiment, content 321A-321D may be of different category 320 (e.g., news programs) or may be a different type of content (e.g., news articles). In various embodiments, interface 301 may include any suitable number of windows, tabs, graphical user interfaces, field, content search fields, and any other suitable approaches for listing and displaying content.

In some cases, information used to form metadata 305 may be cached (e.g., stored) on an edge computing system (e.g., system 133) prior to receiving a request from user device 152 for content. In an example embodiment, the information may be stored at an edge cache, which may be any suitable data storage device. Caching may be done for system 133 if device 152 is expected to connect to system 133. In an example embodiment, edge prediction service 211, as shown in FIG. 2, may be configured to calculate probability P (herein also referred to as a likelihood or expectation) that device 152 will connect to system 133 at a given connection time $T_c$ or at a connection time interval $T_{ic}$. If likelihood P is above a threshold value, edge prediction service 211 may be configured to determine that metadata 305 should be cached (e.g., stored) on system 133 prior to time $T_c$ or time interval $T_{ic}$. An example time interval may be a minute, a few minutes, in a range of a minute to ten minutes, and the like. In an example embodiment, $T_{ic}$ may be an interval between 8:30 am to 8:35 am, or any other suitable interval between a first and a second time. In an example embodiment, connection at time $T_c$ may imply a connection at a time that is about $T_c$, (e.g., a time that is in the interval $\{T_c-\in, T_c+\in\}$ with $\in$ being a few seconds, a few tens of seconds, a few minutes, a few tens of minutes, and the like).

In various embodiments, metadata 305 may reflect an activity pattern and may include content suggestions to the user. In some cases, metadata may include one or more listings of the suggested content.

In an example embodiment, a threshold value for likelihood P may be determined by calculating likelihoods for all user devices that previously connected to system 133 within a given time interval (e.g., within a day, a few days, a week, a few weeks, a month, a few months, a year, and the like) and selecting N highest likelihoods for N devices, where N can be any suitable number of devices (e.g., 100 devices, 200 devices, 500 devices, 1000 devices, 10000 devices, and the like).

As described above, edge computing system 133 may include edge application 213. Application 213 may be configured to run on system 133 and use hardware resources (e.g., system 160) of system 133. In an example embodiment, application 213 may receive requests from a user device, determine whether there is content related information cached (i.e., stored) on system 133 for the user device, retrieve the cached information from a data storage associated with system 133, and using cached information, configure a response (e.g., configure to provide data 305) for a user device (e.g., device 152, as shown in FIG. 3A). In various embodiments, computing system 133 may record details of a request from device 152. For example, system 133 may record a time at which a request has been made, a type of content requested, a location of device 152 based on GPS coordinates that may be received from device 152, an amount of network traffic at the time of the request, or any other details of the request that can be used by edge prediction service 211 to determine a likelihood of the request, and the activity pattern for device 152 at a time of the request, as described above. In various embodiments, application 213 may be configured to communicate some or all of the information related to the request to cloud system 110 to analyze and process the information. For example, cloud system 110 may store the activity pattern of user device 152 for the request time in a user profile. Additionally, or alternatively, system 133 may be configured to communicate to edge prediction service 211 the activity pattern of user device 152, a likelihood of a request at connection time $T_c$ (or connection time interval $T_{ic}$), and the like. In some embodiments, a user profile may be shared between various edge computing devices 130.

Consistent with disclosed embodiments, data 305 may combine "generic" information (e.g., information about morning news shows which is not specific to any particular user) and user-specific information (e.g., user preferences for content, user age, edge computing systems frequently accessed by the user, and the like). For example, as shown in FIG. 3A, data 305 may have a listing of content (e.g., may display content 311B, which amounts to displaying generic information), and may decorate content 311B with user-specific information (e.g., add a note "watched" for content 311B).

An edge computing system (e.g., system 133) may include edge cache manager 215, as noted above. Manager 215 may be configured to allocate space in a local edge cache of system 133 based on the ranking for user devices assigned by edge prediction service 211. In an example embodiment, the ranking for a user device (e.g., device 152) may be time-dependent and may depend on likelihood P for device 152 connecting to system 133 at a given time (e.g., time $T_c$). Manager 215 may further be configured to initiates request to edge application 213 to retrieve user-specific data and/or generic data from cloud system 110. In various embodiments, edge application 213 may retrieve data from cloud system 110 if likelihood P is above a threshold value, as described above. In some cases, manager 215 may be configured to initiates one or more requests to bring generic data when there is storage space available for system 133. Manager 215 may be configured to transfer information from cloud system 110 to system 133 when network traffic is relatively low for cloud system 110 (e.g., when relatively few devices are accessing cloud system 110). In some cases, manager 215 may also be configured to remove low-ranking content.

FIG. 2 also shows that cloud system 110 may include a cloud prediction service 217 and a cloud application 219. Service 217 and application 219 may be implemented as software applications that may be executed by suitable one or more processors of cloud system 110. In an example embodiment, cloud prediction service 217 may offer the predictive functionality if edge prediction service 211 is not available, or for cases, when an edge computing system is not capable of implementing edge prediction service 211 (e.g., edge computing system 133 does not have adequate hardware resources to implement service 211). Additionally, cloud predictive service 217 may provide prediction using data across multiple edge computing systems. For example, cloud predictive service 217 may determine a first likelihood that a user device (e.g., device 152) will connect to a first edge computing system and at least a second likelihood that user device 152 will connect to a second edge computing system. Additionally, service 217 may determine likelihoods for other user devices. For example, service 217 may determine corresponding likelihoods for device 153 to connect to a first, a second, or any other edge computing device. In some cases, service 217 may analyze a trajectory (e.g., locations and velocities) of user devices to predict likelihoods for the user device to connect to different edge computing systems.

Figure 3B:
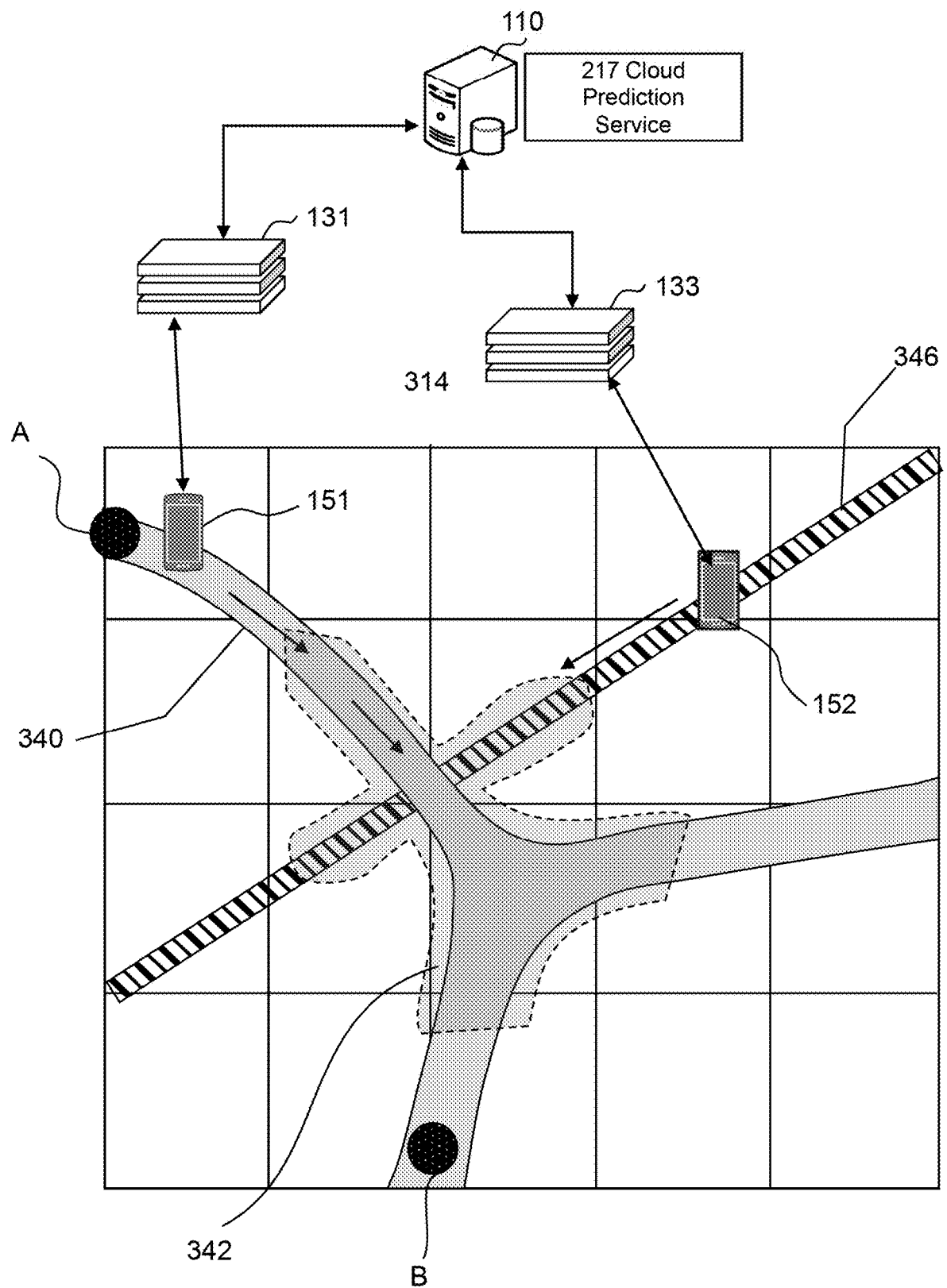
FIG. 3B shows moving mobile devices across a land area corresponding to network cells that may be served by edge computing systems consistent with disclosed embodiments.

For example, FIG. 3B shows user device 151 that is moving along a roadway 340 and user device 152 that is moving along a railroad track 346. User devices 151 and 152 may communicate with their respective edge computing systems 131 and 133 that may collect location information about devices 151 and 152 and communicate the location information to cloud service 217. Service 217 may be configured to analyze the motion of the devices 151 and 152 and predict future locations of these devices. For example, service 217 may predict that device 152 may continue moving along the railroad track 346, and device 151 may continue to move along the roadway 340. Service 217 may predict future locations of user devices 151 and 152 by extrapolating their location based on the velocity of the devices, and/or service 217 may predict device motion based on historically observed data. For example, if device 151 frequently moves from point A to point B, as shown in FIG. 3B, then service 217 may conclude that device 151 may proceed along roadway 340 and reach a congested region 342. Similarly, service 217 may conclude that device 152 may proceed along the railroad track 346 and reach a congested region 342.

In some cases, service 217 may be configured to predict network traffic for different edge computing systems (e.g., systems 131 and 133, as shown in FIG. 3B). Using information about the network traffic and a likelihood for a user device to connect to one of edge computing systems, service 217 may be configured to transmit to one or more edge computing systems at least some of content that may be consumed by a user device connecting to the one or more edge computing systems. For example, if device 152 is expected to connect to edge computing system 133, service 217 may be configured to transmit at least some of content of TV shows that are likely to be consumed by device 152. For instance, if device 152 is expected to requests to watch "Morning Joe" at 7:30 am with a likelihood of 89 percent, at least a portion of the show "Morning Joe" may be uploaded to system 133. However, if a likelihood of consuming a particular show is below a first threshold (e.g., if the likelihood of watching "Morning Joe" is below 80 percent), service 217 may not upload at least a portion of the show "Morning Joe," but instead upload only information related to metadata (e.g., data 305, as shown in FIG. 3A). In some cases, when a likelihood of consuming a particular show (or a particular type of a show) is below a second threshold, service 217 may not upload information related to metadata for the particular show (or the particular type of show) to system 133.

In some cases, when service 217 may be configured to upload at least some of content to an edge computing system, service 217 may analyze network traffic between the edge computing system and cloud system 110. For example, if network traffic between cloud system 110 and edge computing system 133 is low, and there is available bandwidth to transmit at least some of content from cloud system 110 to system 133, the content may be transmitted to and cached by system 133. The content may have a high likelihood of being consumed by at least one user device connected to system 133. For example, if user device 152 has a first likelihood of $P(E_1)=40$ percent of requesting "Good Morning America" (event $E_1$ correspond to device 152 requesting "Good Morning America") and user device 153 has a second likelihood of $P_2(E_2)=70$ percent of requesting "Good Morning America," (event $E_2$ correspond to device 153 requesting "Good Morning America") then the combined likelihood may be given by the expression $P_{CC}=P_2(E_2)+P_1(E_1|\sim E_2)$ (herein, the term $P_1(E_1|\sim E_2)$ correspond to a conditional probability of event $E_1$ to happen when event $E_2$ does not happen). Thus, a combined likelihood may be $P_{CC}=P_2(E_2)+P_1(E_1|\sim E_2)=0.7+0.4(1-0.7)=0.82$. In various embodiments, if combined likelihood $P_{CC}$ is above a threshold value ($P_{CC} \geq P_{T0}$), service 217 may be configured to upload at least some of content to an edge computing system to which user devices (e.g., devices 152 and 152 are likely to be connected).

Consistent with disclosed embodiments, service 217 may be configured to upload metadata (e.g., data 305) to an edge computing system (e.g., system 133) based on a combined likelihood $P_{CD}$ (calculated in the same way as combined likelihood $P_{CC}$, as described above) of metadata to be requested by one or more user devices. For example, user devices 152 and 153 may be expected to request data related to morning news programs, and service 217 may be configured to transmit such data to edge computing system 133 for caching. In various embodiments, when $P_{CD}$ greater or equal to a threshold value ($P_{CD} > P_{T1}$) service 217 may be configured to upload metadata to system 133. In various embodiments, threshold $P_{T0}$ may be different than threshold $P_{T1}$. For example, threshold $P_{T1}$ may be lower than threshold $P_{T0}$. For instance, threshold $P_{T0}$ may be in the range of 20-100 percent, and threshold $P_{T1}$ may be in the range of 1-100 percent.

Alternatively, threshold $P_{T0}$ may be inferred by first computing combined probability $P_{CC}$ for each content item available for streaming and selecting the first M content items having probabilities $P_{CC}$ that are higher than probabilities for other content items. The selected content items may then be uploaded to an example edge computing system. In various embodiments, the process of determining combined probabilities $P_{CC}$ for different content may be repeated for each edge computing system of the content distributing system 100. Similarly, threshold $P_{T1}$ may be determined by computing combined probability $P_{CD}$ for each content related item and selecting the first N content related items (in general M and N may be different numbers) having probabilities $P_{CD}$ that are higher than probabilities for other content related items.

In various embodiments, a bitrate used for transmitting content from cloud system 110 to an edge computing system (e.g., system 133) for caching by system 133 may depend on predicted network traffic for system 133. For example, if system 133 is expected to have light network traffic at 3:00 pm, service 217 may be configured to transmit content for caching at a high bitrate, and if network traffic is expected to be high, service 217 may be configured to transmit content for caching at a lower bitrate. In an example embodiment, a content bitrate as a function of network traffic for a given edge computing system may be calculated using rule-based algorithm or using a machine learning model, trained using historical bitrates and network traffic data.

As shown in FIG. 2, cloud system 110 may include a cloud application 219, which may execute operations similar to operations of edge application 213. In an example embodiment, cloud application 219 may be used when edge application 213 is not accessible or not available. In an example embodiment, cloud application 219 may receive requests from a user device, retrieve information from a data storage (e.g., database 111) associated with system 110, and using the retrieved information, configure a response (e.g., configure to provide data 305) for a user device (e.g., device 152, as shown in FIG. 3A). In various embodiments, cloud system 110 may record details of a request from device 152. For example, system 110 may record the same or similar details as the details of the request that can be recorded by system 133. As described above, such details may include a time at which a request has been made, a type of content requested, a location of a user device based on GPS coordinates that may be received from a user device, an amount of network traffic at the time of the request, or any other details of the request that can be used by cloud system 110 to determine a likelihood of the request, and an activity pattern for device 152 at a time of the request, as described above. In various embodiments, cloud system 110 may store the activity pattern of user device 152 in a user profile. The activity pattern may include a likelihood of a request at connection time $T_c$ (or connection time interval $T_{ic}$), and the like. In some embodiments, system 110 may share the user profile between various edge computing devices 130. In some embodiments, cloud system 110 may generate metadata based on information obtained from a request from a user and may transmit the metadata from the system 110 to user device 152, the metadata may be generated based on a request from the user and a profile of the user.

Figure 4A:
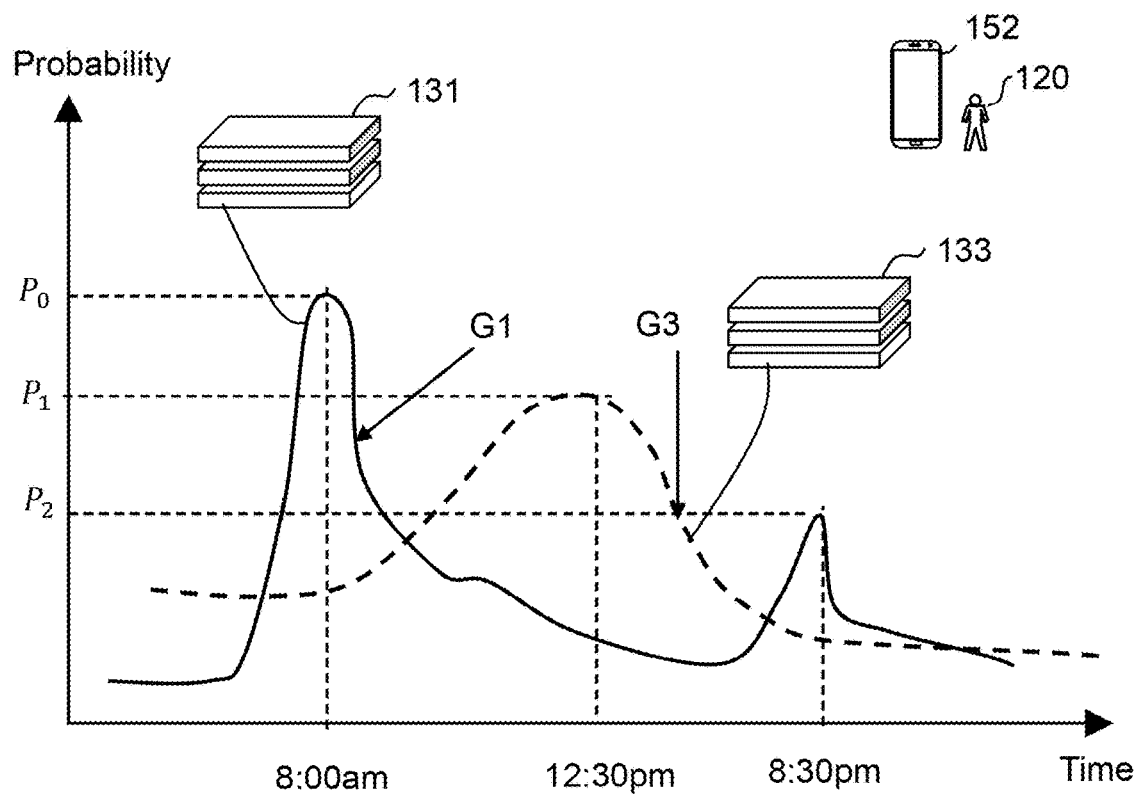
FIGS. 4A and 4B show probability for a device to be connected to one of edge computing systems, consistent with disclosed embodiments.
Figure 4B:
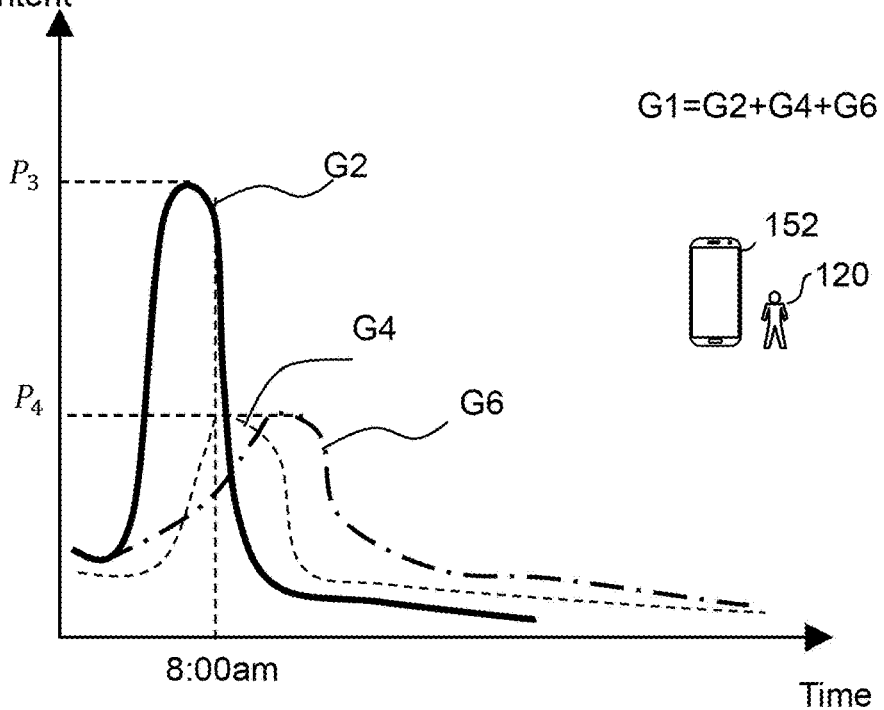

FIG. 4A illustrates example graphs used to describe probability (i.e., likelihood) of a given device (e.g., device 152) to be connected to edge computing system 131 or edge computing system 133 for different times during a day. For example, device 152 may have a peak probability $P_0$ of connecting to system 131 at 8:00 am, and a peak probability $P_2$ of connecting to system 131 at 8:30 pm, as illustrated by a graph G1. A graph G3 shows that during a lunchtime (e.g., at 12:30 pm) device 152 may have a peak probability $P_1$ of connecting to edge computing system 133. FIG. 4B shows that probability may further be determined for different content requested by device 152. For example, device 152 may request content related to a show "Morning Joe" with a probability described by a graph G2 (graph G2 may have a peak probability $P_3$ at a time of about 8:00 am), may request content related to a show "SpongeBob" with a probability described by a graph G4 (graph G4 may have a peak probability $P_4$ at a time of about 8:00 am), and may request content related to "The Weather Channel" described by a graph G6 (graph G6 may have a peak probability $P_4$ at a time of about 8:00 am). Graphs G2, G4, and G6 may be combined (added) to yield probability graph G1 describing a likelihood for user device 152 to connect to system 131.

In various embodiments, one or more user devices may be connecting to an edge computing system (e.g., system 133). System 133 may perform operations (e.g., operations may be performed by edge prediction service 211, edge application 213, or edge cache manager 215). The operations may include determining a likelihood that a user device will connect to edge computing system 133 during a given time window (e.g., during a time window between 8:30 am and 8:35 am). The likelihood may be determined using any of the above-discussed approaches. For example, system 133 may determine the likelihood based on analyzing historical connection data for connecting the user device with edge computing system 133 during the time window. For instance, historical data may include tracking how often device 152 connected with system 133 during a given time window (e.g., during the time window between 8:30 am and 8:35 am). In an example embodiment, the time window may be in a range of a minute to ten minutes. In some cases, the likelihood may be determined for a plurality of non-overlapping time windows, the plurality of time windows comprising a duration of time of an entire day. As shown in FIG. 4A, likelihoods may be determined by each edge computing device for user device 152 to connect to that edge computing systems. For example, edge computing device 131 may determine a first likelihood (e.g., likelihood illustrated by graph G1 as shown in FIG. 4A) that user device 152 will connect to edge computing system 131 and edge computing system 133 may determine a second likelihood (e.g., likelihood illustrated by graph G3 as shown in FIG. 4A) that user device 152 will connect to edge computing system 133.

In an example embodiment, based on the determined likelihood, system 133 may be configured to store information reflecting an activity pattern associated with the user device. The activity pattern may be any suitable activity pattern, as described above. The operations may further include receiving a request for content from the user device, generating metadata (e.g., data 305, as shown in FIG. 3A) based on the stored information and the request, and transmitting the metadata to the user device. In some embodiments, the operations may include determining whether information is available on edge computing system 133 to which user device 152 is connected. If the information is available, system 133 may be configured to transmit the metadata to the user device based on the stored information and the request. However, when information is not available, system 133 may be configured to request needed information from cloud system 110 in order to prepare metadata.

Figure 5A:
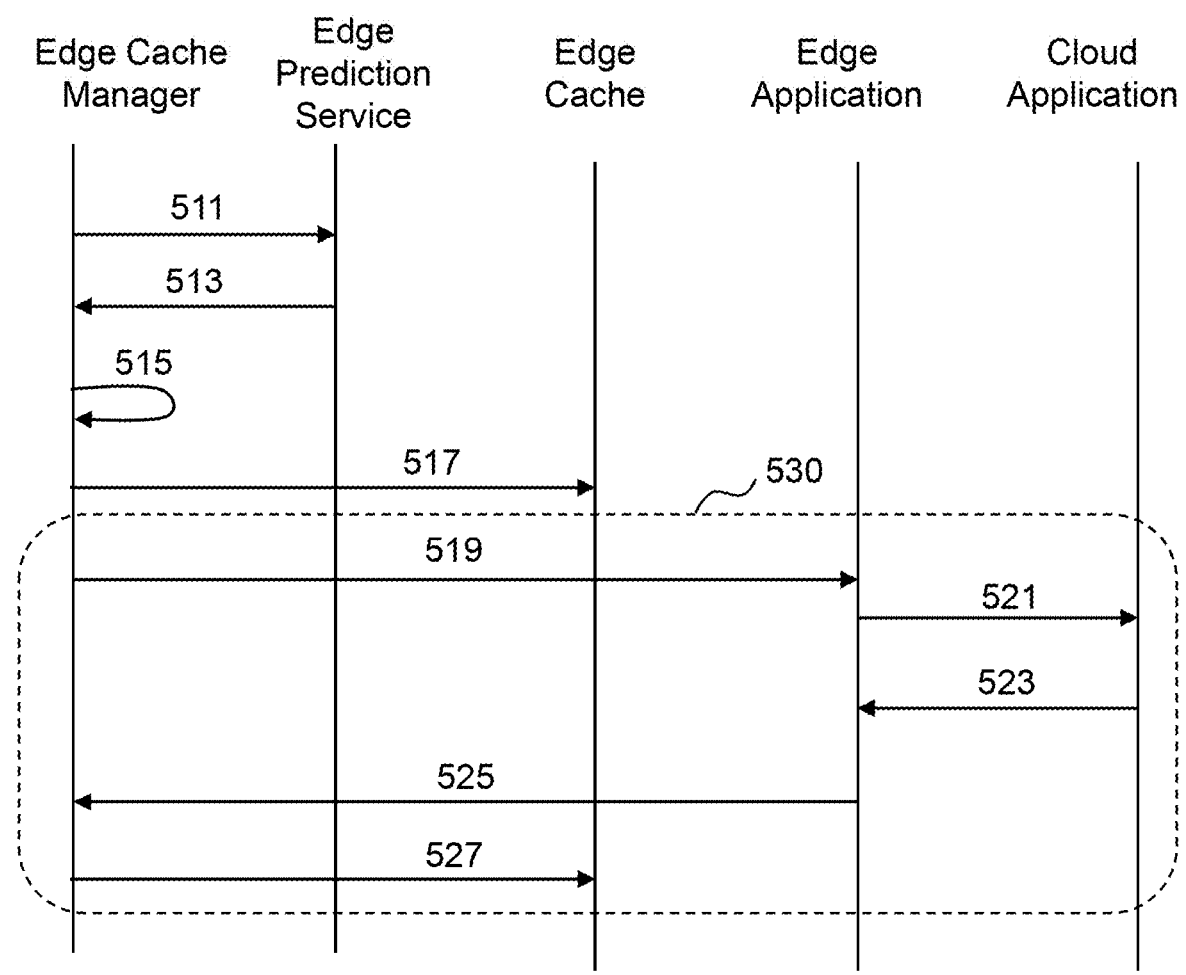
FIGS. 5A and 5B are example diagrams describing a process of storing and providing content, consistent with disclosed embodiments.

FIG. 5A shows a diagram of an example process 501 for prefetching information in a cache of an edge computing system (i.e., storing information prior to transmitting the information to a user device). At step 511 of process 501, an edge cache manager (e.g., manager 215, as shown in FIG. 2) of an edge computing system (e.g., system 133) may request an edge prediction service (e.g., service 211) to get a list of all user devices that have a high likelihood of accessing edge computing system 133 for a next time window (the next time window may be a time window following time of step 511). At step 513, edge prediction service 211 may return a list of devices $D_i$ with device associated likelihood values $P_i$. At step 515, edge cache manager 215 may be configured to order a list of devices $D_i$ in descending order of $P_i$, and may select the topmost devices $D_1 \ldots D_N$ as devices for which data needs to be cached. At step 517, edge cache manager 215 may clear a cache (i.e., may clear a storage location) for user devices that are not part of devices $D_1 \ldots D_N$ of the list of devices. For each device $D_i$ in the list of devices $D_1 \ldots D_N$, manager 215 may, at step 519, request an edge application (e.g., edge application 213) to obtain (herein also referred to as fetch) user-related information (the user-related information may include metadata that may further include user-specific data and generic data related to content) from a cloud system 110. In various embodiments, region 530 indicates that steps 519-527 are performed for each device D. In an example embodiment, manager 215 may at step 519 request edge application 213 to interact with a cloud application (e.g., cloud application 219) to obtain user-related information. At step 521, edge application 213 may request the user-related information, and at step 523, cloud application 523 may transmit the user-related information to edge application 213. At step 525, edge application may provide the user-related information to edge cache manager 215, and at step 527, manager 215 may store the user-related information at an edge cache. The edge cache may be any suitable memory storage for storing user data such as metadata. In some cases, the edge cache may store at least some of the content that is frequently being requested by one or more user devices. In various embodiments, the edge cache may include a software application for receiving requests for user data and for transmitting the user data upon receiving the request.

Figure 5B:
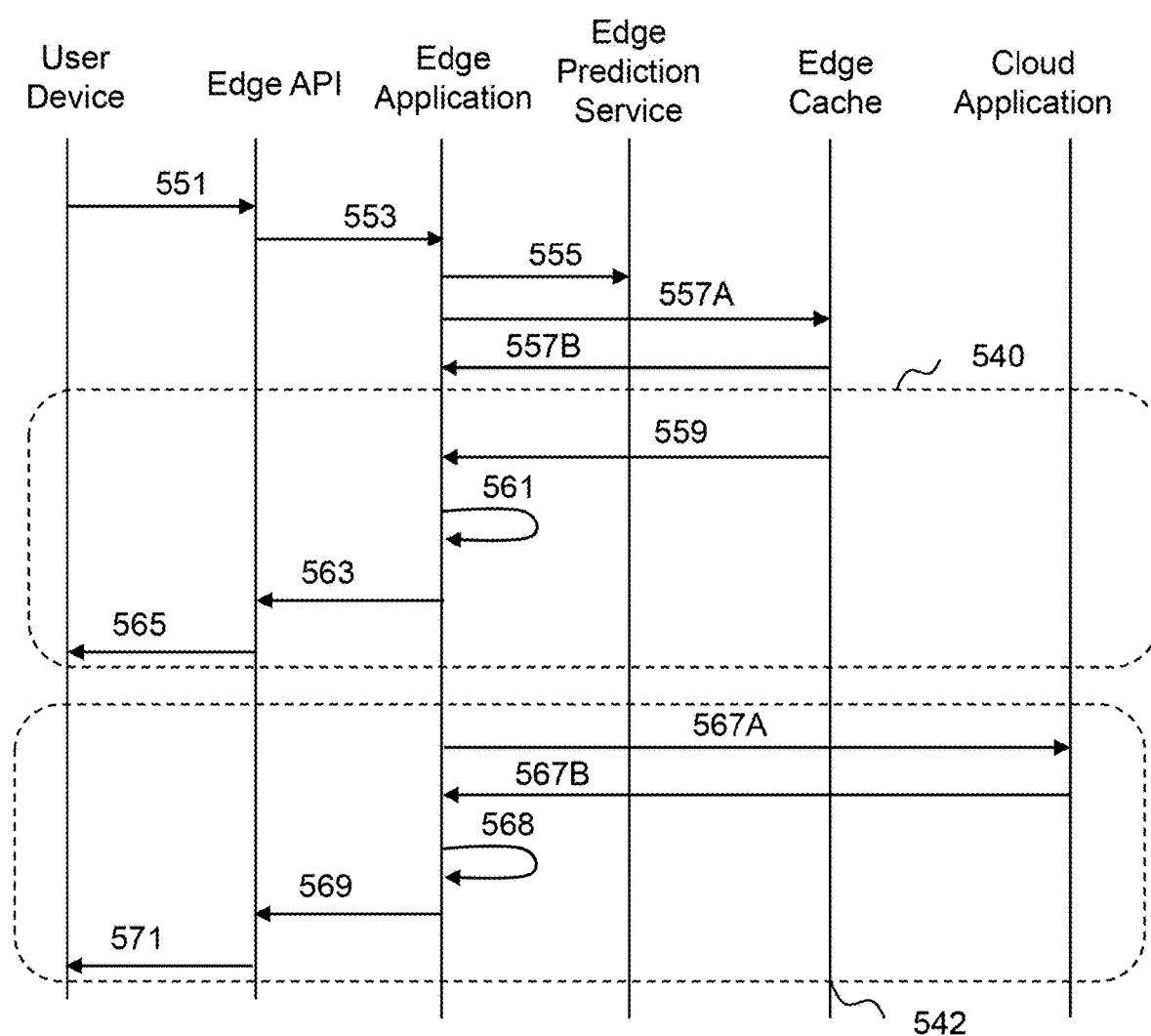

FIG. 5B shows a diagram of an example process 502 for transmitting metadata to a user device based on a prefetched information stored at an edge computing system. At step 551 of process 502, a user device (e.g., device 152) may submit a request to an edge application interface (edge API), and the edge API may transmit the request to edge application 213 at step 553. At step 555 edge application 213 may prepare data for edge prediction service 211, the data extracted from a user request and a profile associated with the user (e.g., the data may include a time of the request, device 152 identification number, content or type of content requested by device 152, and the like). Further, at step 555, application 213 may submit data to service 211. Additionally, at step 557A, application 213 may inquire from the software application associated with the edge cache, whether user information is cached at the edge cache. At step 557B, the edge cache may communicate to application 213 whether the user information is cached at the edge cache. If the user information is cached, process 502 may include performing steps 559-565, as shown in a region 540, and if the user information is not cached, process 502 may proceed to steps 567-571, as shown in a region 542.

At step 559 of process 502, the edge cache may return the user information that may include user-specific information (e.g., information about content that was previously consumed by the user) and generic information (e.g., content related information, such as a list of TV programs). At step 561, edge application 213 may be configured to process the user information received from the edge cache to produce metadata (e.g., data 305, as shown in FIG. 3) and provide metadata to the edge API at step 563. At step 565, the edge API may be configured to provide metadata to user device 152. In an example embodiment, metadata may populate an interface for displaying the metadata.

If the information for user device 152 is not stored in the edge cache, as determined in step 557, edge application 213 may be configured to request user-specific and generic information from cloud application 219, at step 567A. At step 567B, the information may be transmitted to application 213 from application 219, and at step 568, edge application 213 may be configured to process the user information received from the edge cache to produce metadata. Step 568 may be the same as step 561. At step 569, application 213 may be configured to provide metadata to the edge API, and at step 571, the edge API may be configured to provide metadata to user device 152. Steps 569 and 571 may be the same as corresponding steps 563 and 565.

In various embodiments, for each edge computing system (or at least some of edge computing systems), cloud system 110 may be configured to track the identifications (IDs) of user devices that are connected to the edge computing systems. In some cases, instead of using cloud system 110 for tracking devices, each (or at least some of) edge computing system(s) may be configured to track the user devices. In some cases, tracking of user devices may be performed for a time window (e.g., a time window of 5 minutes). Consistent with disclosed embodiments, an edge computing system (e.g., system 133) may be configured to calculate a probability of a user device (e.g., device 152) to be connected to system 133 during a particular time window. As described above, a probability may be calculated based on historical data for devices connected to system 133 during the same time window in the past (e.g., in the past day, few days, week, and the like, as described above). For example, if device 152 was connected to system 133 for the duration of time corresponding to the entire time window (e.g., device 152 was connected to system 133 for 5 minutes without interruptions for a time window between 8:30 am and 8:35 am) every day during the past several days (e.g., during the past week), system 133 may determine that device 152 gets a higher probability rating that another user device that was connected to the edge computing system 133 for a shorter duration of time for only some of the days (i.e., was not connected to system 133 every day for the past several days).

In various embodiments, as previously described, edge computing system 133 may select N devices with the highest probability, and request the information associated with the selected user devices (or accounts of users for these user devices). In an example embodiment, system 133 may request personalized metadata for a user of a user device from relevant cloud services, and cache the personalized metadata using edge cache prior to the start of the time window.

Total caching resources may be optimized for edge computing system 133 by allocating storage available for system 133 (e.g., storage associated with the edge cache of system 133) to the selected N devices, as described above. If some storage resources are claimed for different usage, the resources may be released to allocate information for the N devices. For example, if storage resources store information for devices that do not have a sufficiently high likelihood to be connected to system 133 (i.e., the devices that are not part of the N devices selected to have the highest probability), such information may be overwritten with more relevant information related to one of the N selected devices.

Consistent with disclosed embodiments, edge application 213 of edge computing system 133 may be configured to retrieve from cloud application 219 first the information for user devices that have the highest probability to be connected to system 133. Such an approach may optimize network and CPU resources for edge computing system 133 and for cloud system 110. Thus, when there may not be enough time to retrieve data for all user devices prior to the beginning time for a time window, system 133 may be configured to retrieve information for user devices that are determined to have the highest likelihood to be connected to system 133.

Aspects of disclosed embodiments may include tracking a type of activity a user device (e.g., device 152) typically performs during a time window. For example, if during the time window, user device 152 requests to watch linear services, then edge application 213 may be configured to request information for a personalized linear schedule to be cached. Alternatively, if device 152 requests to watch VOD or DVR, then application 213 may be configured to cache a list of VOD assets or the list of viewer DVR recordings.

In various embodiments, edge application 213 may also register with relevant cloud services to receive notifications if any of personalized metadata is changed, in order to refresh cached data. Additionally, edge application 213 may also periodically retrieve and cache the relevant non-personalized metadata, such as a schedule of TV channels. In an example embodiment, a process of caching information may be optimized to store only metadata which is relevant to location of an edge computing system (for example, only channels of a region where the edge computing system is located may be obtained from cloud system and cached by application 213 of the edge computing system).

Consistent with disclosed embodiments, when a request is received from a user device by application 213, application 213 may use the stored (i.e., cached) information that may contain user-specific data and generic data to produce metadata, without a need to communicate with cloud service 110, thus saving network and computing resources of cloud system 110, as well as reducing a latency for a reply to the received request from the user device. In some cases, computer and network usage of an edge computing system may be optimized by caching user device-related information and/or user account-related information in advance of predicted usage peaks, thus reducing a computational and a network peak load of cloud system 110.

In various embodiments, an edge computing system may be configured to allow connection of about a few thousand user devices at a time. Thus, it may include sufficient computing and storage resources to cache and process personalized metadata for these devices.

In some cases, edge prediction service 211 may be configured to determine whether or not to cache information related to a user device not base on a likelihood of the user device connecting to an edge computing system, but based on maximizing an expected utility of caching the information for the user device. In an example embodiment, maximizing the expected utility may include minimizing the cost associated with computing and network resources of content distributing system 100, while maximizing user satisfaction for users of content distributing system 100.

In an example embodiment, a utility may be defined as latency savings (which may be represented by a monetary value) minus associated costs for all cached and not cached events for a given time window. Maximizing expected utility may include finding an optimal balance between reducing latency for a user device as well as reducing system costs associated with computing and network system resources.

For example, accessing cloud system 110 via a network to retrieve user-related information, such as metadata, may have an associated cost. Also, caching the user-related information may have an associated cost. In an example embodiment, a latency benefit L may be defined as a money value of latency savings (dollars per time unit) for a given cloud system 110. In an example embodiment, latency savings may translate to money savings for an owning entity of cloud system 110. A cloud latency $L_C$ may be an expected latency (determined in terms of a monetary cost) for cloud system 110 for a reply to a request from a user device when the user device submits the request to system 110. Cloud latency $L_c$ may depend on a specific cloud application or a cloud service that is used to process the request from a user device. Cloud latency $L_C$ may be determined by analyzing historical communication data between user devices and cloud system 110. In an example embodiment, cloud latency $L_C$ may change depending on cloud performance, a time of the day, and the like. Similarly, an edge latency $L_E$ (determined in terms of a monetary cost) may be an expected latency for an edge computing system (e.g., system 133) for a reply to a request from a user device when the user device submits the request to system 133. In an example embodiment, $L_E > L_C$, and $L = L_E - L_C < 0$, thus resulting in monetary saving (i.e., corresponding to a negative cost).

Costs associated with content distributing system 100, as shown in FIG. 1, may include a network access cost $N_C$ corresponding to a cost of accessing the network via which cloud system 110, edge computing systems 130 and user devices 150 are communicating, and a bandwidth cost $B_c$ which may be a cost of transferring data (per unit of data transmitted) from cloud system 110 via the network to edge computing systems 130.

In an example embodiment, a total network cost for a time t for communicating with a user device $D_i$ via a specific cloud application $A_C$ may be given by the expression $N_T(t, D_i, A_C) = N_C(t, D_i, A_C) + B_C(t, D_i, A_C) \cdot P_B(t, D_i, A_C)$, where $N_T(t, D_i, A_C)$ is a total network cost at time t, $N_C(t, D_i, A_C)$ is a network access cost at time t, $B_C(t, D_i, A_C)$ is a bandwidth cost at time t, and $P_B(t, D_i, A_C)$ is an expected bandwidth usage at time t, with all the quantities calculated for user device $D_i$ and application $A_C$. In various embodiments, network cost may depend on a specific cloud application $A_C$ or a cloud service that is used for communicating with user device $D_i$.

Further, costs associated with system 100 may include storage cost $S(D_i)$ associated with caching information at edge computing systems 130 for device D. Cost S may be expressed as $S = f_i \cdot C_c \cdot P_{cs}$, where $C_c$ is a cost of caching a unit size of data (e.g., cost of caching a kilobyte of data), $P_{cs}$ is a predicted (expected) size of cached data, and $f_i = 1$ when caching for device $D_i$ is performed, or $f_i = 0$ when the caching is not performed.

A total utility $U_t$ may be calculated for four distinct events $E_i$. In an example embodiment, event $E_1$ may correspond to an event when a user device requests metadata from an edge computing system, and the edge computing system has cached data that can be used to satisfy a request from the user device; event $E_2$ may correspond to an event when a user device requests metadata from an edge computing system, and the edge computing system does not have cached data that can be used to satisfy a request from the user device; event $E_3$ correspond to an event when a user device does not request metadata from an edge computing system, and the edge computing system has cached data that can be used to satisfy a request from the user device; and event $E_4$ may correspond to an event when a user device does not request metadata from an edge computing system, and the edge computing system does not have cached data that can be used to satisfy a request from the user device. For case $E_1$, total utility $U_T(E_1)$ is given by $U_T(E_1) = -L_E - N_T - S$; for case $E_2$, $U_T(E_2) = -L_C - N_T$; for case $E_3$, $U_T(E_3) = -S$; and for case $E_4$, $U_T(E_4) = 0$. For clarity, the functional dependence of the above quantities on $D_i$, and time t is not explicitly shown. Considering likelihood $P_i$ for device $D_i$ to be connected to an edge computing system, the expected total utility for a device $D_i$ may be calculated as $EXP(U_T; D_i, f_i) = P_i \cdot [U_T(E_1) + U_T(E_2)] + (1 - P_i) U_T(E_3)$, and total expected utility for all user devices may be calculated as $EXP(U_T; ALL, f_i) = \Sigma_i EXP(U_T; D_i, f_i)$. In an example embodiment, if devices $\{D_1 \ldots D_N\}$ are selected with a sequence of probabilities $\{P_1 \ldots P_N\}$, then a vector $F = \{f_1 \ldots f_N\}$ may be used to indicate whether or not to cache data for devices $\{D_1 \ldots D_N\}$. In various embodiments, vector F may be a control variable for maximizing expected utility $EXP(U_T; ALL, f_i)$. In an example embodiment, vector F may be represented by a binary number (e.g., $F = \{01001 \ldots\} = \{f_1 = 0, f_2 = 1, f_3 = 0, f_4 = 0, f_5 = 1, \ldots\}$) where a binary number of size N can represent integer values $\{1 \ldots 2^N - 1\}$.

Expected utility $EXP(U_T; D_i, f_i)$ may be calculated for each edge computing system for each user device $D_i$. Expected total utility $EXP(U_T; ALL, f_i)$, may be a utility summed over all of user devices $D_i$ connected to a particular edge computing system. Additionally, a network expected total utility may be defined as a sum of all the expected total utilities, where each one of the expected total utility is computed for a particular one of edge computing systems.

Figure 6A:
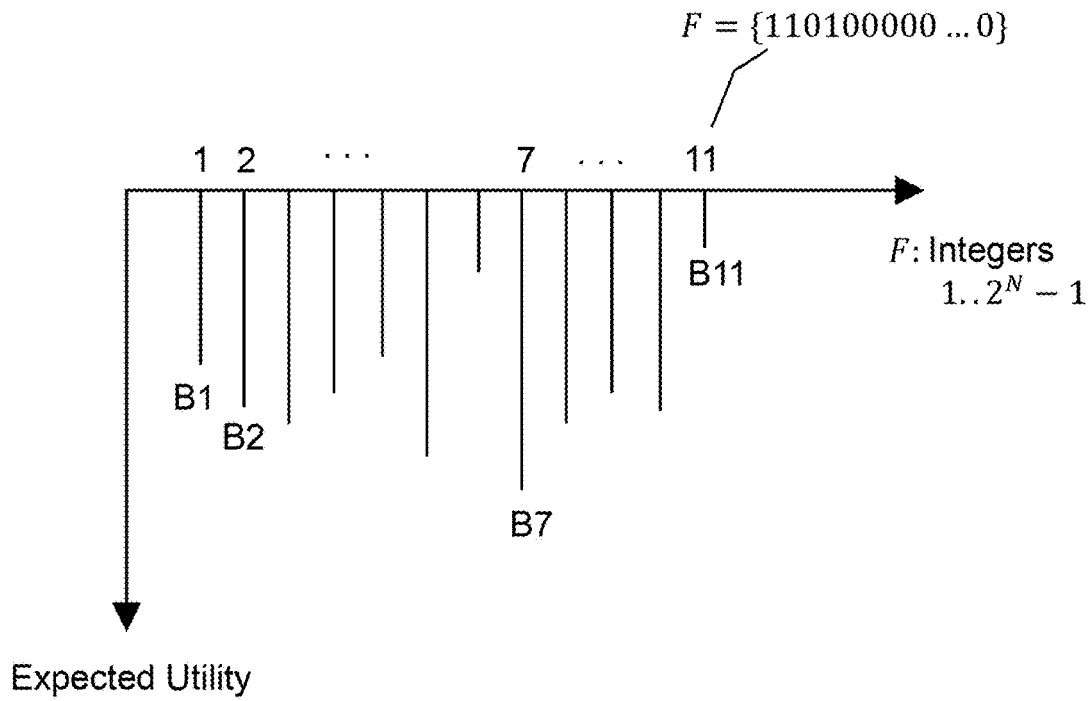
FIGS. 6A and 6B show example graphs of expected utility as a function of caching information for different user devices, consistent with disclosed embodiments.

Example embodiments of values of expected utility function are shown in FIG. 6A as a function of integers $\{1 \ldots 2^N - 1\}$, with each integer representing a particular sequence of $\{f_1 \ldots f_N\}$. For example, integer 11 represents a sequence of $\{1101000 \ldots 0\}$. For each integer plotted on axis F, an example of expected utility is plotted using bars, vertical bars (e.g., bars B1, B2, B7, and B11 are shown for integer values 1, 2, 7 and 11). In an example embodiment, bar B11 may correspond to an expected utility with a maximum value (note that expected utility may be a negative function, as there are always costs associated with distributing content to user devices).

Figure 6B:
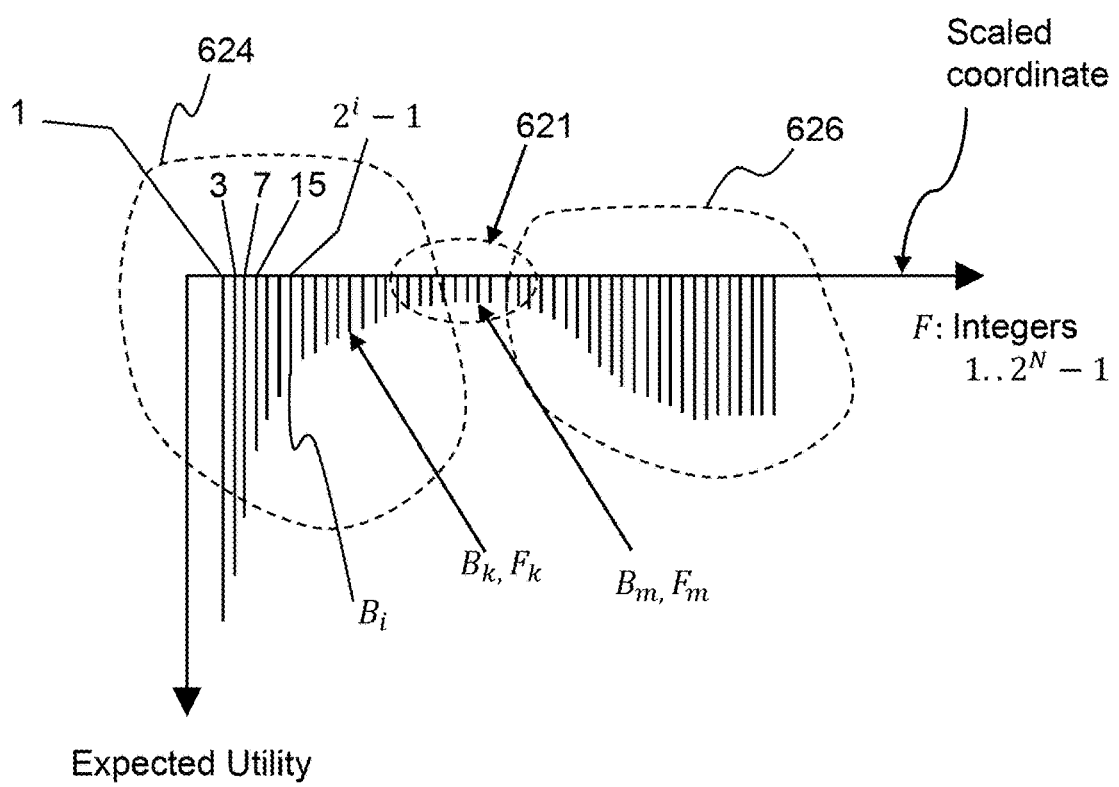

FIG. 6B shows an example embodiment of expected utility bars $B_i$ for devices that are sorted using probability $P_i$. Bars $B_i$ are plotted at points $2^i - 1$ that are expressed in binary system as $\{111 \ldots 110000 \ldots 000\}$ with number of "1" being i. In FIG. 6B, the horizontal coordinate axis is scaled (similar to a logarithmic scale) such that bars $B_i$ appear to be equally spaced. As shown in FIG. 6B, caching data for devices having high probability values (as shown by bars in region 624) results in a fast increase in expected utility. However, caching data for devices with smaller probability values (as shown by bars in region 626) may lead to a decrease in expected utility. Thus, the maximum expected utility may be located in region 621, as shown in FIG. 6B.

In various embodiments, selecting a maximizing vector $F_m = \{111 \ldots 1110 \ldots 00\}$ for caching m devices having highest probabilities may result in maximum utility value $B_m$. Also, the expected utility calculated for each vector F may be a subject to constraints such as, for example, a total disk space available for an edge cache of an edge computing system (e.g., system 133). Thus, the edge cache of system 133 may not be able to cache all the metadata which may be desired to be cached, as the edge cache may run out of disk space. Therefore, the total utility is calculated taking into account all of user devices that may connect to an edge computing system (e.g., system 133) as well as expected application used by such devices. For instance, a given user device may have 30% chance of connecting to a first cloud application that may require a first amount of metadata, and may have 20% chance of connecting to a second cloud application that may require a second amount of metadata. In various embodiments, the amount of metadata that can be stored by the edge cache of system 133 may critically influence the maximum expected utility that can be obtained. For example, if the edge cache may only cache metadata for k user devices, the maximum expected utility may be $B_k$ and a corresponding vector may be $F_k$, as shown in FIG. 6B. As shown in FIG. 6B, the expected utility $B_k$ may be lower than utility $B_m$, which can be obtained when a larger disk space is available for storing the metadata of various user devices.

FIG. 7 shows an example process for caching and aggregating metadata for user devices. At step 711 of process 701, an edge computing system (e.g., system 133) may be configured to select a time window for which to cache the data. Such a selection of the time window may be performed, for example, by edge application 213. At step 713, edge application 213 may determine whether to cache data for a device (e.g., device $D_i$). Step 713 may be repeated for each device $D_i$ in a list of devices that are likely to connect to system 133. If caching is determined to be beneficial (step 713, Yes), application 213 may be configured to cache data at step 715. Alternatively, if caching is determined to be not beneficial (step 713, No), process 701 may be completed.

Figure 8A:
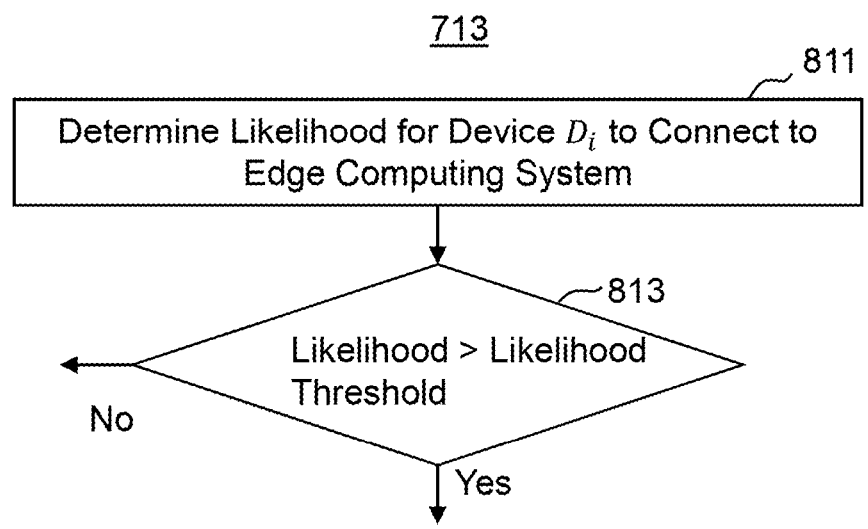
FIGS. 8A and 8B are example flowcharts for determining whether content needs to be stored at an edge computing system, consistent with disclosed embodiments.

At step 713, whether caching is beneficial or not may be determined by performing steps 811 and 813, as shown in FIG. 8A. For example, at step 811, edge prediction service 211 may determine a likelihood (e.g., likelihood P, as described above), for Device $D_i$ to connect to an edge computing system (e.g., system 133). If likelihood P is equal or greater than a likelihood threshold value (step 813, Yes), then caching may be determined to be beneficial (step 713, Yes). Alternatively, if likelihood P is below a likelihood threshold value (step 813, No), then caching may be determined to not be beneficial (step 713, No).

Figure 8B:
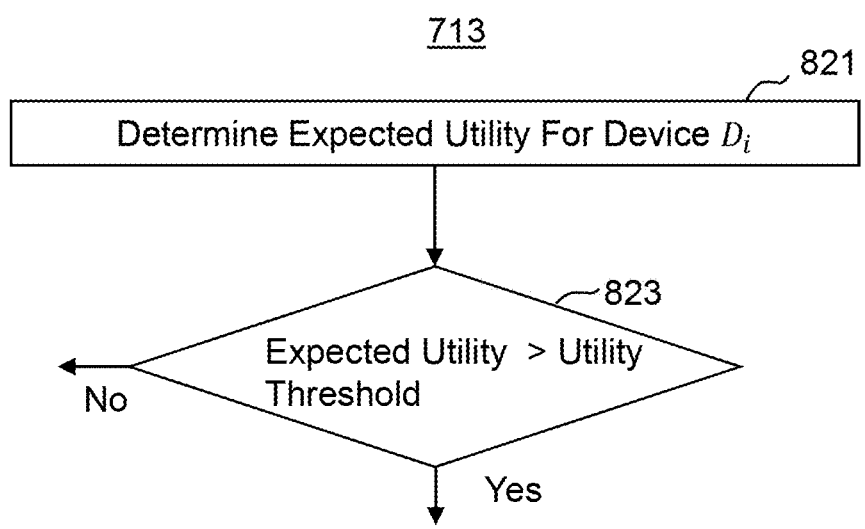

Alternatively, at step 713, whether caching is beneficial or not may be determined by performing steps 821 and 823, as shown in FIG. 8B. For example, at step 821, edge prediction service 211 may determine an expected utility, as described above for caching information for Device $D_i$ on an edge computing system (e.g., system 133). If the expected utility is equal or greater than a utility threshold value (step 823, Yes), then caching may be determined to be beneficial (step 713, Yes). Alternatively, the expected utility is below the utility threshold value (step 823, No), then caching may be determined to not be beneficial (step 713, No).

FIG. 9 shows an example process 901 for providing a user device with metadata by an edge computing system (e.g., system 133). At step 911 of process 901, application 213 of system 133 may be configured to receive a request from a user, at step 913, application 213 may be configured to determine if information for a user is available in a cache (e.g., edge cache) of edge computing system 133. If the information is available (step 913, Yes), application 213 may be configured to prepare metadata using information obtained from the edge cache at step 915. Alternatively, if the information is not available (step 913, No), application 213 may be configured to request information from cloud system 110 and receive the needed information at step 917. After completion of step 917, process 901 may proceed to step 915, as shown in FIG. 9. Upon completion of step 915, process 901 may proceed to step 919 and transmit the metadata to a user device.

Figure 10A:
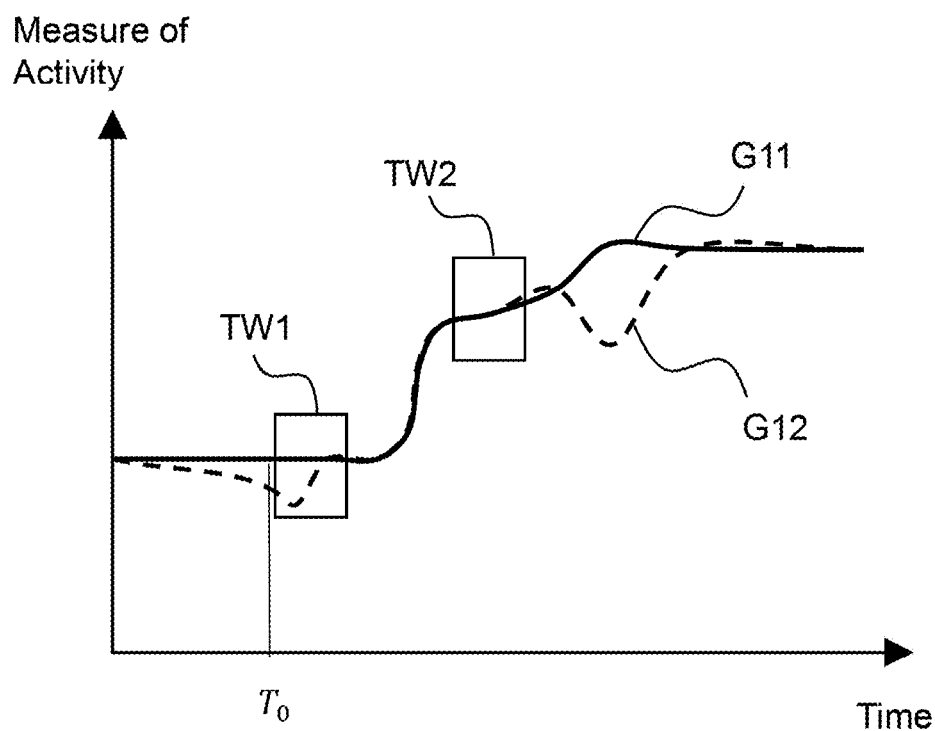
FIGS. 10A and 10B show example graphs of user device activity, consistent with disclosed embodiments.

FIG. 10A illustrates graphs G11 and G12 that may correspond to a measure of activity for a user. The measure may be determined by mapping the activity of a user device (e.g., device 152) to a number (or a set of numbers) for a given point in time. An example measure function may map a type of metadata requested by a user (e.g., the user requested metadata related to News). The metadata may correspond to a type of content requested by the user, and the content may be mapped to a number using mapping function M(Content Type$_i$)=$m_i$. For example, M("News Shows")=1, M("Movies")=2, M("Cartoons")=3, and the like. Using the mapping of the measure function, the activity of the user may be represented as a list of numbers that may be different for different points in time. For example, graph G11 shows a measure of activity for user device 152 for a first day as a function of time, and graph G12 shows the measure of activity for device 152 for a second day as a function of time. In some cases, the metadata may correspond to a particular cloud application accessed by a user device, and such information may also be used for computing a suitable measure function reflecting the activity of the user device. For example, when the user device accesses a video broadcasting application, a first measure function may be calculated reflecting the activity of the user device in association with the video broadcasting application, and when the user device accesses a news application (e.g., CNN News), a second measure function may be calculated reflecting the activity of the user device in association with the news application.

In some embodiments, application 213 may be configured to determine a likelihood that a user device (e.g., device 152) will connect to an edge computing system (e.g., system 133) and based on the determined likelihood, store on system 133 first information reflecting a first activity pattern associated with the user device during a first time window TW1, as shown in FIG. 10A. Further, based on the determined likelihood, application 213 may be configured to store on system 133 second information reflecting a second activity pattern associated with device 152 during a second time window. In some cases, when device 152 may be connected to different edge computing systems, a first edge computing system may determine (e.g., determine via application 213) a first likelihood that device 152 will connect to the first edge computing system, and a second edge computing system may determine a second likelihood that device 152 will connect to the second edge computing system. In an example embodiment, based on the first likelihood, the first edge computing system may be configured to store first information reflecting a first activity pattern associated with user device 152 during a first time window (e.g., window TW1), and based on the second likelihood, the second edge computing system may be configured to store second information reflecting a second activity pattern associated with user device 152 during a second time window (e.g., window TW2).

Figure 10B:
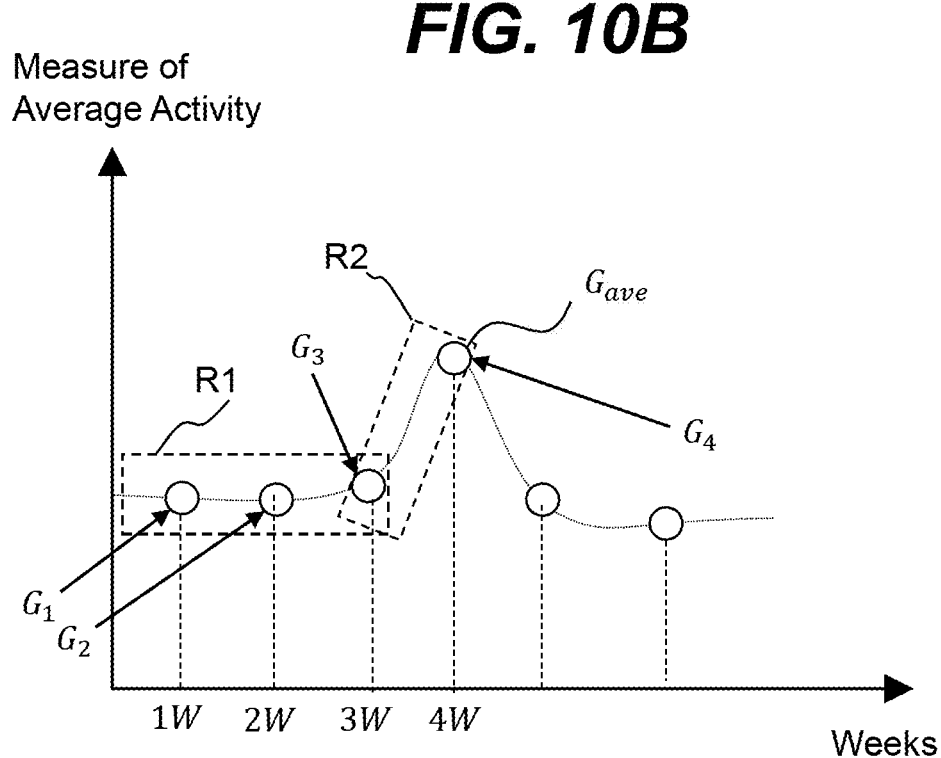

An activity pattern may be determined by averaging activities, as shown by G11 and G12 graphs over several days. For example, for a point in time (e.g., a point $T_0$) activities of device 152 represented by measure function may be averaged over several days (e.g., may be averaged over a week). The averaged activities represented by data points $G_{ave}$ are plotted in FIG. 10B, as a function of several weeks. In an example embodiment, data points $G_{ave}$ may be obtained as an average of a measure of activity for device 152 (e.g., a measure of activity is represented by graphs G11, and G12) over a sliding time window of several days (e.g., sliding time window may be of a duration of two days, three days, four days, five, days, seven days, or even more days). In an example embodiment, related to FIG. 10B, the sliding time window may be less than a week. FIG. 10B shows that data points $G_1 \ldots G_3$ determined as an average activity for first three weeks (herein, the first three weeks are shown in FIG. 10B by corresponding labels 1W, 2W, 3W) have substantially similar values as indicated by region R1, however, a data point $G_4$ for the fourth week (the fourth week is labeled as 4W in FIG. 10B) has a substantially different value from points $G_1 \ldots G_3$. Herein the term "substantially different" as referred to numerical values may be determined when a value is different by more than 10 percent, 20 percent, 30 percent, 100 percent, and the like from another value, as measured relative to a lower value. In an example embodiment, substantially different values may be different by more than 10 percent as measured relative to a lower value.

In an example embodiment, region R2 may correspond to a time between the third week and the fourth week when an activity pattern for a user is changing. In some embodiments, application 213 of system 133 may be configured to detect such changes in user activity and update information related to user device 152. For example, application 213 may request new information from cloud system 110 based on the new activity pattern for device 152.

As described above, system 100 may include various devices, such as processors, memory devices, and various user devices. For example, user devices may include one or more computing devices configured to perform one or more operations consistent with disclosed embodiments. For example, user devices may include a desktop computer, a laptop, a server, a mobile device (e.g., tablet, smartphone, etc.), a set-top box, a gaming device, a wearable computing device, or another type of computing device. The user devices may include one or more processors configured to execute software instructions stored in memory, such as memory included in user devices, to perform various operations. The user devices may be configured for wired and/or wireless communications and may include software that, when executed by a processor, performs internet-related communication (e.g., TCP/IP) and content display processes. For instance, the user devices may execute browser software that generates and displays interfaces, including content on a display device included in, or connected to, user devices. The user devices may execute software applications that allow user devices to communicate with components over system 100, and generate and display content in interfaces via display devices included in user devices.

The disclosed embodiments are not limited to any particular configuration of user devices. In certain embodiments, user devices may be configured to execute software instructions relating to location services, such as GPS locations. For example, user devices may be configured to determine a geographic location and provide location data and time stamp data corresponding to the location data to system 100.

System 100 may include one or more computing systems (e.g., edge computing systems, a cloud computing system, and the like) that perform operations to store and provide content. System 100 may include databases (e.g., database 111, as shown in FIG. 1) that include user profile and any data (e.g., historical data) associated with previously conducted meetings. Computing systems of system 100 may include processors (e.g., processor 161) that may include multiple core processors to handle concurrently multiple operations and/or streams. For example, edge computing system 133 and/or cloud system 110 may include parallel processing units to concurrently handle information obtained from multiple user devices.

Database 111 may include one or more computing devices configured with appropriate software to perform operations for providing information to and from system 100. Database 102 may include, for example, Oracle™ database, Sybase™ database, or other relational databases or non-relational databases, such as Hadoop™ sequence files, HBase™, or Cassandra™. In an illustrative embodiment, database 102 may include computing components (e.g., database management system, database server, etc.) configured to receive and process requests for data stored in memory devices of the database and to provide data from the database.

System 100 may include a network system that may include any type of connection between various computing components. For example, the network system may facilitate the exchange of information via network connections that may include Internet connections, Local Area Network connections, near field communication (NFC), or other suitable connection(s) that enables the sending and receiving of information between the components of the network system. In some embodiments, one or more components of the network system may communicate directly through a dedicated communication link(s).

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for managing content in a network having one or more user devices and one or more edge computing systems, the method comprising:
    determining an expected utility for a user device on an edge computing system, wherein determining the expected utility comprises:
        determining a likelihood that the user device will connect to an edge computing system during a time window;
        determining a network cost corresponding to a cost associated with the user device connecting directly to a cloud computing system;
        determining a storage cost corresponding to a cost associated with storing information on the edge computing system; and
        determining a latency benefit corresponding to a benefit of having a reduced latency when the user device connects to the edge computing system for obtaining the information; and
    based on the determined expected utility, storing on the edge computing system information reflecting an activity pattern associated with the user device;
    receiving a request for content from the user device;

generating metadata based on the stored information and the request; and transmitting the metadata to the user device for display.

2. The method of claim 1, wherein determining the likelihood is based on analyzing historical connection data for connecting the user device with the edge computing system during the time window.

3. The method of claim 1, wherein the time window is in a range of a minute to ten minutes.

4. The method of claim 1, wherein the likelihood is determined for a plurality of non-overlapping time windows, the plurality of time windows comprising a duration of time of an entire day.

5. The method of claim 1, further comprising determining a first likelihood that the user device will connect to a first edge computing system and at least a second likelihood that the user device will connect to a second edge computing system.

6. The method of claim 1, wherein the activity pattern is determined based on content requested by a user.

7. The method of claim 6, wherein the information reflecting the activity pattern comprises suggested content to the user.

8. The method of claim 1, wherein generating metadata includes generating one or more listings of suggested content.

9. The method of claim 1, wherein the information reflecting the activity pattern is updated if the activity pattern changes.

10. The method of claim 1, wherein the activity pattern is determined for the time window.

11. The method of claim 1, further comprising:

based on the determined likelihood, storing on the edge computing system first information reflecting a first activity pattern associated with the user device during a first time window; and based on the determined likelihood, storing on the edge computing system second information reflecting a second activity pattern associated with the particular user device during a second time window.

12. The method of claim 1, further comprising:

determining a first likelihood that the user device will connect to a first edge computing system;

determining a second likelihood that the user device will connect to a second edge computing system;

based on the first likelihood, storing on the first edge computing system first information reflecting a first activity pattern associated with the user device during a first time window; and based on the second likelihood, storing on the second edge computing system second information reflecting a second activity pattern associated with the user device during a second time window.

13. The method of claim 1, wherein the information reflecting the activity pattern is updated based on content requested by a user.

14. The method of claim 1, further comprising determining whether the information is available on an edge computing system to which the user device is connected.

15. The method of claim 1, wherein generating metadata comprises:

providing a cloud computing system a request from a user; and transmitting the metadata from the cloud computing system to the user device, the metadata generated based on the request from the user and a profile of the user.

16. A method for managing content in a network having one or more user devices and one or more edge computing systems, the method comprising:

determining an expected utility for a user device on an edge computing system, wherein determining the expected utility comprises:

determining a likelihood that the user device will connect to the edge computing system during a time window;

determining a network cost corresponding to a cost associated with the user device connecting directly to a cloud computing system;

determining a storage cost corresponding to a cost associated with storing information on the edge computing system; and determining a latency benefit corresponding to a benefit of having a reduced latency when the user device connects to the edge computing system for obtaining the information; and based on the determined expected utility, storing on the edge computing system, information reflecting an activity pattern associated with the user device.

17. The method of claim 16, wherein determining the likelihood is based on analyzing historical connection data for connecting the user device with the edge computing system during the time window.

18. The method of claim 16, wherein the expected utility is calculated for a plurality of edge computing devices to which the user device is expected to be connected.

19. The method of claim 16, wherein the expected utility is calculated for a plurality of user devices which are expected to connect to one or more edge computing devices.

20. The method of claim 19, wherein the method further comprises maximizing the network cost, the storage cost, and the latency benefit associated with the plurality of user devices.

* * * * *